US006282257B1

(12) United States Patent
Basu et al.

(10) Patent No.: US 6,282,257 B1
(45) Date of Patent: Aug. 28, 2001

(54) FAST HIERARCHICAL BACKPROJECTION METHOD FOR IMAGING

(75) Inventors: Samit Basu; Yoram Bresler, both of Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/418,933

(22) Filed: Oct. 15, 1999

Related U.S. Application Data

(63) Continuation-in-part of application No. 09/338,677, filed on Jun. 23, 1999.

(51) Int. Cl.⁷ .................................................. A61B 6/05
(52) U.S. Cl. ................................. 378/15; 378/4; 378/901
(58) Field of Search ........................... 378/4, 8, 15, 901; 382/131

(56) References Cited

U.S. PATENT DOCUMENTS

| | | | |
|---|---|---|---|
| 4,042,811 | 8/1977 | Brunnett et al. | 235/151.3 |
| 4,149,247 | 4/1979 | Pavkovich et al. | 364/414 |
| 4,217,641 | 8/1980 | Naparstek | 364/414 |
| 4,491,932 | 1/1985 | Ruhman et al. | 364/900 |
| 4,616,318 | 10/1986 | Crawford | 364/414 |
| 4,626,991 | 12/1986 | Crawford et al. | 364/414 |
| 4,709,333 | 11/1987 | Crawford | 364/414 |
| 4,714,997 | 12/1987 | Crawford | 364/414 |
| 4,858,128 | 8/1989 | Nowak | 364/413.13 |
| 4,930,076 | 5/1990 | Meckley | 364/413.21 |
| 4,991,093 | 2/1991 | Roberge et al. | 364/413.15 |

(List continued on next page.)

FOREIGN PATENT DOCUMENTS

611181 * 8/1994 (EP) .

OTHER PUBLICATIONS

Stephan Nilsson; Fast Backprojection; Dept. Of Electrical Eng., Linkopings universitet, Sweden, pp 1–8; Jul. 4, 1996.

Per–Erik Danielsson; Iterative Techniques for Projection and Back–Projection and Back–Projection; Dept. Of Electrical Eng., Linkopings universitet, Sweden, pp 1–28, Jun. 10, 1997.

Stephan Nilsson; Application of fast backprojection techniques for some inverse problems of intergral geometry; Dept. Of Mathematics., Liknopings universitet, Sweden, Jun. 19, 1997.

Cobb et al; "Real–time Image Formation Effort Using Quadtree Backprojection and Reconfigurable Processing"; Third Annual Federated Laboratory on Advanced Sensors; pp. 133–137; Feb. 2–4, 1999.

Oh et al.; "Multi–resolution Mixed radix Quadtree SAR Image Focusing Algorithms", Third Annual Federated Laboratory Symposium on Advanced Sensors; pp. 139–143; Feb. 2–4, 1999.

(List continued on next page.)

*Primary Examiner*—David V. Bruce
(74) *Attorney, Agent, or Firm*—Greer, Burns & Crain, Ltd.

(57) ABSTRACT

A process for backprojecting a sinogram to a tomographic image includes the steps of subdividing the sinogram into a plurality of subsinograms, preferably in a recursive manner, until each subsinogram represents an image as small as one pixel in size. Each of the final subsinograms is backprojected to produce a plurality of corresponding subimages, and the subimages are aggregated to create the image. Two algorithms can be used in the decomposition process. An exact decomposition algorithm is accurate, but relatively slow. An approximation decomposition algorithm is less accurate, but fast. By switching between the two algorithms, accurate decomposition is realized in a short time, speeding up the backprojection process considerably.

23 Claims, 6 Drawing Sheets

U.S. PATENT DOCUMENTS

| | | | |
|---|---|---|---|
| 5,008,822 | | 4/1991 | Brunett et al. .................. 364/413.21 |
| 5,136,660 | | 8/1992 | Flickner et al. ........................ 382/46 |
| 5,224,037 | | 6/1993 | Jones et al. ...................... 364/413.19 |
| 5,229,934 | * | 7/1993 | Mattson et al. .................. 364/413.21 |
| 5,243,664 | * | 9/1993 | Tuy .......................................... 382/6 |
| 5,300,782 | * | 4/1994 | Johnston et al. ................ 250/363.03 |
| 5,375,156 | * | 12/1994 | Kuo-Petravic et a. ................... 378/9 |
| 5,396,528 | | 3/1995 | Hu et al. ................................. 378/14 |
| 5,438,602 | * | 8/1995 | Crawford et al. ........................ 378/4 |
| 5,552,605 | * | 9/1996 | Arata ............................... 250/363.04 |
| 5,559,335 | * | 9/1996 | Zeng et al. ...................... 250/363.04 |
| 5,625,190 | * | 4/1997 | Crandall .......................... 250/363.03 |
| 5,654,820 | * | 8/1997 | Lu et al. ............................... 359/298 |
| 5,727,041 | * | 3/1998 | Hsieh ....................................... 378/4 |
| 5,778,038 | * | 7/1998 | Brandt et al. ............................ 378/4 |
| 5,796,803 | * | 8/1998 | Flohr et al. ............................ 378/15 |
| 5,805,098 | | 9/1998 | McCorkle .............................. 342/25 |
| 5,848,114 | * | 12/1998 | Kawai et al. ............................ 378/4 |
| 5,862,198 | * | 1/1999 | Samarasekera et al. ................. 378/4 |
| 5,901,196 | | 5/1999 | Sauer et al. .............................. 378/4 |
| 6,028,907 | | 2/2000 | Adler et al. .............................. 378/4 |
| 6,108,007 | * | 8/2000 | Sochet ................................. 345/430 |

OTHER PUBLICATIONS

Martin L. Brady; "A Fast Discrete Approximation Algorithm for the Radon Transform", *SIAM J. Comput.* vol. 27, No. 1, pp. 107–119; Feb. 1998.

A. Brandt et al.; "Fast Calculation of Multiple Line Integrals"; *SIAM J. Sci. Comput.*, vol. 20, No. 4, pp. 1517–1429; 1999.

Achi Brandt et al.; :A Fast and Accurate Multilevel Inversion of the Radon Transform; *SIAM J. Appl. Math.*, vol. 60, No. 2, pp. 437–462; 1999.

Carl R. Crawford; "Reprojection Using a Parallel Backprojector", Elscint Ltd., P.O. Box 5258, Haifa, Israel; Mar. 12, 1986.

Carl R. Crawford et al.; "High Speed Reprojection and its Applications"; *SPIE vol. 914 Medical Imaging II*; 1988.

Per–Erik Daniesson et al.; Backprojection in $O(N^2 \log N)$ Time; IEEE Medical Imaging Conference, Albuquerque, NM; Nov. 1–15, 1997.

Alexander H. Delaney; "A Fast and Accurate Fourier Algorithm for Iterative Parallel–Beam Tomography"; *IEEE Transactions on Image Processing*, vol. 5, No. 5, pp. 740–753; May 1996.

E.C. Frey et al.; "A Fast Projector–Backprojector Pair Modeling the Asymmertric, Spatially Varying Scatter Response Function for Scatter Compensation in SPECT Imaging"; *IEEE Transactions on Nuclear Science*, vol. 40, No. 4, pp. 1192–1197; Aug. 1993.

Gary H. Glover et al.; "An Algorithm for the Reduction of Metal Clip Artifacts in CT Reconstructions"; *Medical Physics*, vol. 8, No. 6, pp. 799–807;Nov./Dec. 1981.

Sung–Cheng Huang et al.; "Capability Evaluation of a Sinogram Error Detection and Correction Method in Computed Tomography"; *IEEE Transactions of Nuclear Science*, vol. 39, No. 4, pp. 1106–1110; 1992.

Eric Michielssen; "A Multilevel Matrix Decomposition Algorithm for Analyzing Scattering from Large Structures"; *IEEE Transactions on Antennas and Progagation*, vol. 44, No. 8, pp. 1086–1093; Aug. 1996.

John M. Ollinger; "Iterative Reconstruction–Reprojection and the Expectation–Maximization Algorithm"; *IEEE Transactions on Medical Imaging*, vol. 9, No. 1, pp. 94–98; Mar. 1990.

John M. Ollinger; "Reconstruction–Reprojection Processing of Transmission Scans and the Variance of PET Images"; *IEEE Transactions on Nuclear Science*, vol. 39, No. 4, pp. 1122–1125; 1992.

T.M. Peters; "Algorithms for Fast Back–and–Re–Projection in Computed Tomography"; *IEEE Transactions on Nuclear Science*, vol. NS–28, No. 4, pp. 3641–3646; Aug. 1961.

Jorge L.C. Sanz; "Computing Projections of Digital Images in Image Processing Pipeline Architecture"; *IEEE Transactions on Acoustics, Speech, and Signal Processing*, vol. ASSP–35, No. 2, pp. 198–207; Feb. 1987.

Herman Schomberg et al.; "The Gridding Method for Image Reconstruction by Fourier Transformation"; *IEEE Transactions on Medical Imaging*, vol. 14, No. 3, pp. 596–607; Sep. 1995.

Dan–Chu Yu et al.; "Study of Reprojection Methods in Terms of Their Resolution Loss and Sampling Errors"; *IEEE Transactions on Nuclear Science*, vol. 40, No. 4, pp. 1174–1178; Aug. 1993.

G.L. Zeng; "A Rotating and Warping Projector/Backprojector for Fan–Beam and Cone–Beam Iterative Algorithm "; *IEEE Transactions on Nuclear Science*, vol. 41, No. 6, pp. 2807–2811; Dec 1994.

* cited by examiner

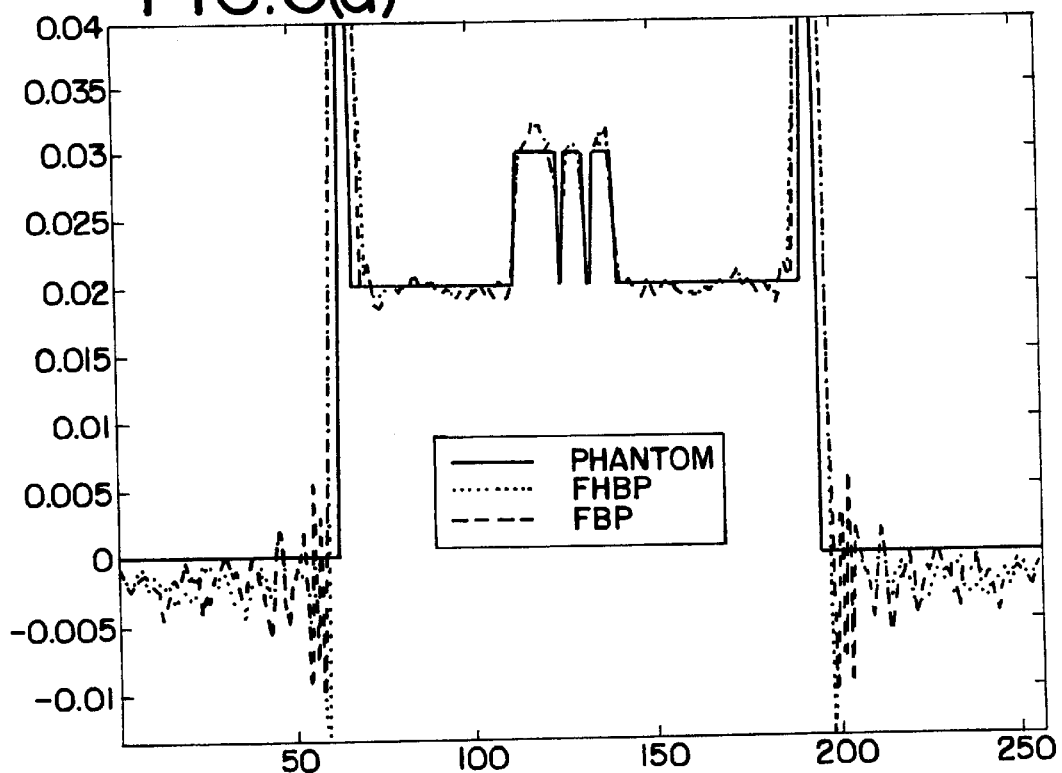
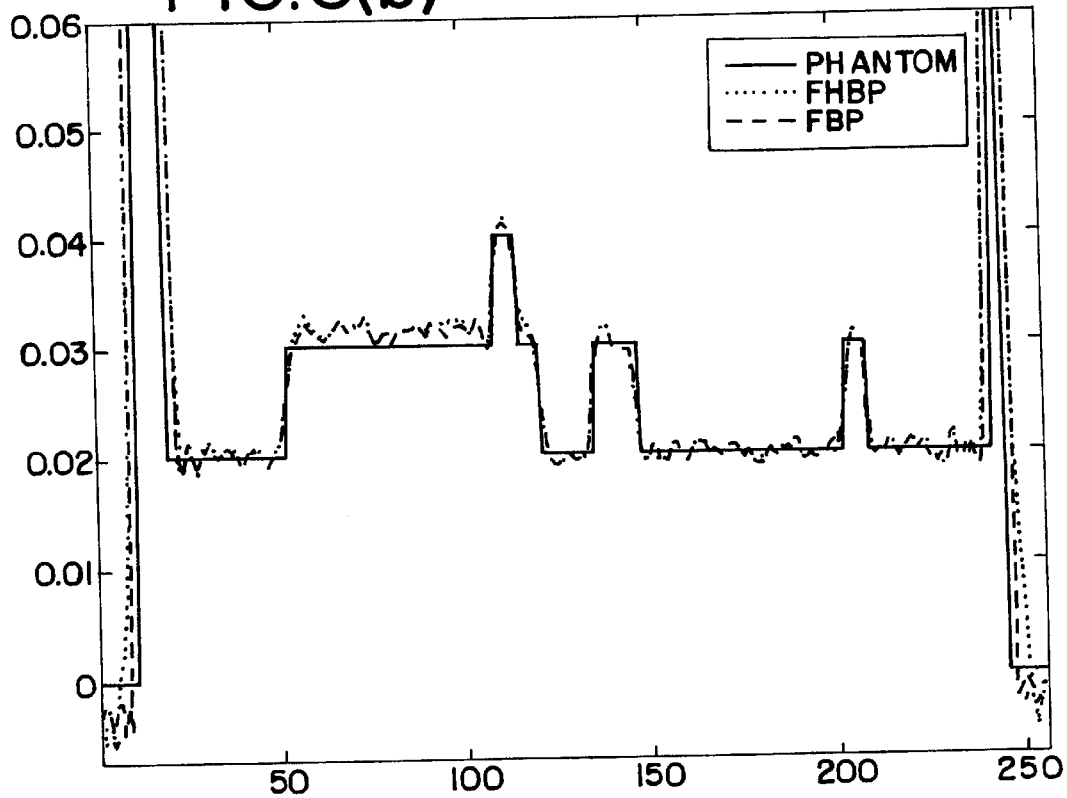

FAST HIERARCHICAL BACKPROJECTION METHOD FOR IMAGING

This is a continuation-in-part of Ser. No. 09/338,677, filed Jun. 23, 1999.

FIELD OF THE INVENTION

This invention relates to imaging, and more particularly, to a method for reconstructing tomographic images from projections.

BACKGROUND OF THE INVENTION

The reconstruction problem in 2D axial computed tomography (CT) is one of recovering an image from a set of its line-integral projections at different angles. The type of algorithm used to address the reconstruction problem depends almost exclusively on how much of the line-integral information is available. When line-integrals are available from all possible directions, and the measurement noise is negligible, the Filtered BackProjection (FBP) reconstruction technique (also known as the Convolution BackProjection technique, or CBP) is a popular method. Based on a discretization of an inverse formula for the Radon transform, the FBP consists of filtering each projection by a prespecified filter, followed by a backprojection operation. The filtering operation requires $O(N^2 \log N)$ operations when implemented by an FFT, or as little as $O(N^2)$ operations when implemented as a convolution with a fixed impulse response. In contrast, the backprojection operation, which computes for each pixel in the reconstructed image the sum of all line integrals that pass through that pixel, requires $O(N^3)$ operations, assuming a reconstruction of $N^2$ pixels, and projections at $O(N)$ angles. Backprojection, therefore, by far dominates the computational cost of FBP (or CBP) reconstruction.

Traditionally, for medical applications, backprojection has been accomplished by special hardware that exploits parallelism of the backprojection process to try and achieve near real-time reconstruction of a single slice. See, e.g., U.S. Pat. No. 4,042,811 and U.S. Pat. No. 4,491,932. However, there still exists a lag in reconstruction time that is becoming increasingly important as technologies that are able to acquire data at ever faster rates are being introduced. With the increasing data rates, the FBP has become the bottleneck in the reconstruction and display process, and presents a barrier to real-time imaging.

Existing fast algorithms for reconstruction are based on either the Fourier Slice Theorem, or on a multi-resolution resampling of the backprojection, such as Brandt's method of U.S. Pat. No. 5,778,038, which is incorporated by reference in its entirety. Algorithms based on the Fourier Slice Theorem use interpolations to transform the Fourier projection data from a polar to a Cartesian grid, from which the reconstruction can be obtained by an inverse FFT. These fast algorithms, known as Fourier reconstruction algorithms (FRA), generally have $O(N^2 \log N)$ complexity. J. Schomberg and J. Timmer, "The Gridding Method for Image Reconstruction by Fourier Transformation", IEEE Trans. Med. Imag., vol. 14, September 1995. Unfortunately, the interpolation step generally requires a large number of computations to avoid the introduction of artifacts into the reconstruction. Experimental evidence indicates that for reasonable image sizes $N \leq 10^3$, the realized performance gain of algorithms based on the Fourier Slice Theorem over the more straightforward FBP is significantly less than the potential N/log N speedup. This also generally comes at a loss in reconstruction quality as well.

Brandt's method uses different nonuniformly sampled grids to efficiently represent the projections at different stages of the backprojection. The resulting algorithm has $O(N^2 \log N)$ complexity. The algorithm generates blurred reconstructions, so a postprocessing step involving a deconvolution with a Gaussian approximation to the point spread function is necessary to counteract the blurring. This deconvolution stop is not fully effective, and can lead to further artifacts. This algorithm, although potentially fast, does not achieve the accuracy of conventional FBP. Thus, there is a need for faster and accurate algorithms for reconstruction of tomographic images.

Accordingly, one object of this invention is to provide new and improved reconstruction methods for creating images from projections.

Another object is to provide new and improved methods for reconstructing tomographic images which are faster than existing methods.

Yet another object is to provide new and improved methods for tomographic backprojection for use in all applications where existing methods are used, but which are faster than existing methods.

SUMMARY OF THE INVENTION

In keeping with one aspect of this invention, a method for backprojecting sinograms to images includes the steps of dividing a filtered sinogram into a plurality of subdivisions, each a smaller sinogram. The smaller sinograms are successively subdivided until the divisions represent a subimage as small as one pixel. The subsinograms are backprojected to create subimages, and the subimages are successively aggregated to create the image for display.

The method uses two algorithms to subdivide the sinogram. For one algorithm subdivision is exact, and for the other algorithm the subdivision is an approximation. The first algorithm is accurate, but relatively slow, and the second algorithm is faster, but less accurate. By performing some subdivisions with the exact decomposition algorithm and some subdivisions with the approximation decomposition algorithm, switching between the two algorithms in one of a number of suitable ways, an accurate result can be obtained quickly.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIGS. 6(a) and 6(b) are slice plots showing the results obtained with the present invention, compared with the results of methods of the prior art.

DETAILED DESCRIPTION

Figure 1:
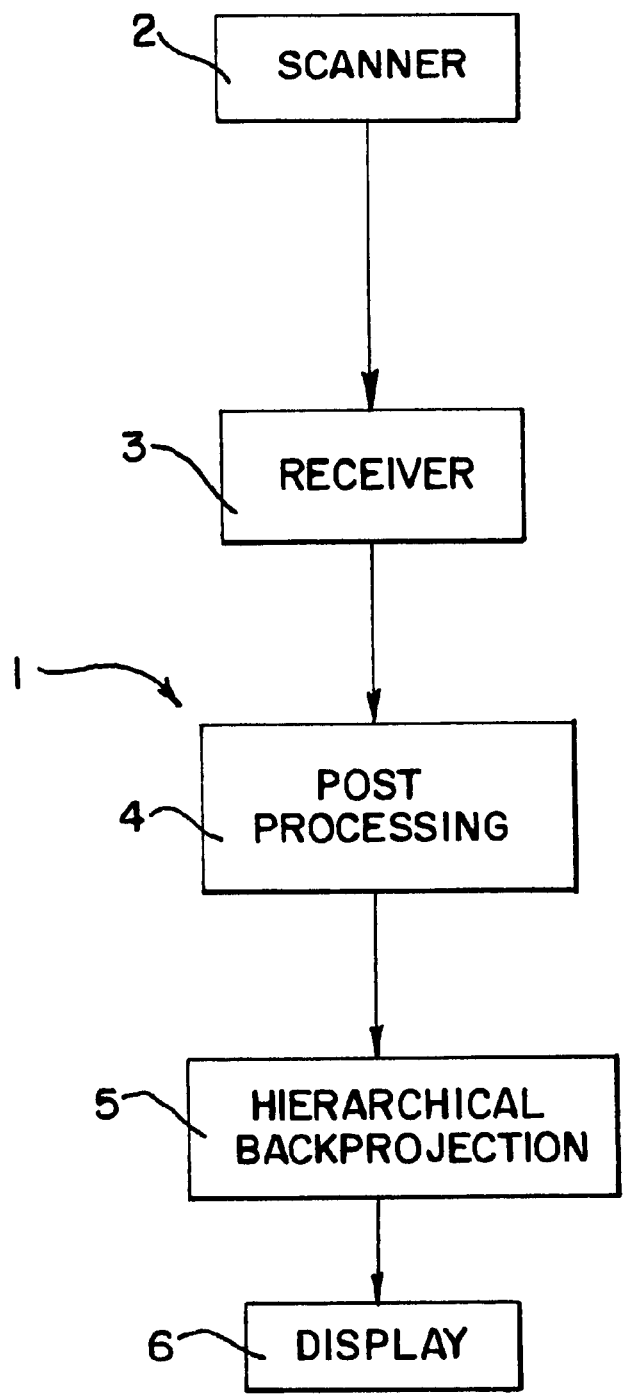
FIG. 1 is a block diagram of imaging apparatus made in accordance with the principles of the present invention.

The present invention has application in a variety of imaging apparatus, including CT scanners. Typical imaging apparatus 1 (FIG. 1) includes a scanner 2 which acquires data from an object such as a head, and sends raw data to a receiver 3. The data is processed in a post-processor 4, which can include re-binning, filtering, or other processes. The post-processor 4 generates a sinogram which is back-projected in a Hierarchical BackProjection (HBP) apparatus 5. The HBP 5 produces an image which is shown on a display 6 or other suitable output device.

A sinogram includes any two-dimensional array of numerical values in which one index is radial, and the other index is angular. Examples of a sinogram include a collection of projections, a collection of radially filtered projections, and a collection of synthetic-aperture-radar (SAR) data that has been radially-inverse-Fourier-transformed, and the like.

To better understand the present invention, a general understanding of direct filtered backprojection (FBP) reconstruction will be given.

Figure 7:
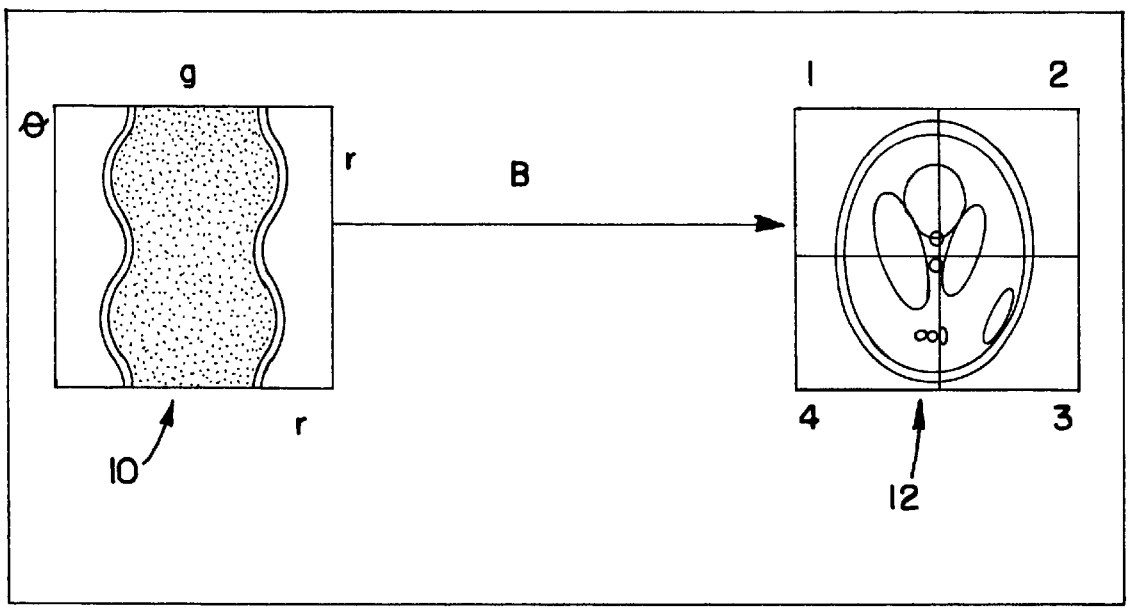
FIG. 7 is a diagram of a conventional filtered backprojection method.

As seen in FIG. 7, a sinogram 10, which in this case is data generated from a tomographic image, is directly backprojected to create an image 12, using known algorithms. While direct backprojection has an acceptable degree of accuracy, it has a high computational cost and is time consuming. The present invention, called Hierarchical BackProjection, addresses some of the shortcomings of direct reconstruction and other algorithms.

HBP methods are based on a hierarchical decomposition of the Radon transform, and require $O(N^2 \log N)$ time for reconstruction. The algorithms used in HBP do not suffer from the artifacts from which FRA's suffer (as there are no frequency domain interpolations), and offer significant improvement in performance over the FRA's and Brandt's method, with little or no loss in reconstruction quality compared to the direct FBP reconstruction. The potential speedup for images of size $10^3$ pixels square approaches and even exceeds two orders of magnitude. Thus, FBP-based reconstructions can be obtained in a small fraction of the time currently required. The proposed algorithms are also highly parallelizable, and can reuse existing hardware accelerations. Furthermore, the HBP algorithm produces reconstructions visually similar to the FBP.

The basic principle behind the hierarchical decomposition is as follows: the backprojection of an N×N image can be written as the sum of shifted backprojections of 4 smaller images, each of size N/2×N/2. Because these images are half the (linear) size of the original image, they can be computed from sinograms with half the number of angular samples. Thus, if N projections were available and needed for the reconstruction of the original image, then N/2 projections are needed to reconstruct the smaller images. Each of the 4 backprojections of the subimages will cost $(N/2)^2 N/2 = N^3/8$ operations, and 4 of these backprojections must be performed for a total cost of $N^3/2$ to reconstruct the object, compared with $N^3$ operations for the original backprojection. If this decomposition is applied recursively, then the cost is $N^2 \log N$, reducing the image size and projection count by a factor of 2 at each stage.

In the present invention, two algorithms are used to sub-divide the sinogram. The first algorithm is an exact decomposition algorithm which will be described in connection with FIG. 2, and the second algorithm is an approximation decomposition algorithm which will be described in connection with FIG. 3. The exact decomposition algorithm is accurate, but relatively slow, and the approximation decomposition algorithm is faster, but less accurate. By performing some subdivisions with each algorithm, switching between the two algorithms in one of a number of suitable ways, accurate reconstructions can be obtained quickly.

When the exact decomposition algorithm is used (FIG. 2), the sinogram 10 is backprojected to create the image 12 by dividing the sinogram into four subsinograms, 14, 16, 18 and 20, in processors (or steps) 13, 15, 17 and 19, respectively. Each subsinogram 14, 16, 18 and 20 is further subdivided, into a total of sixteen subsinograms (not shown), and each of those subdivided subsinograms are further subdivided, until the subsinograms represent an image as small as one pixel. The last subsinograms are then backprojected to create the smallest subimages, shown diagramatically in FIG. 2 as subimages 22, 24, 26 and 28. The subimages are then successively aggregated to create the image 12.

Figure 2:
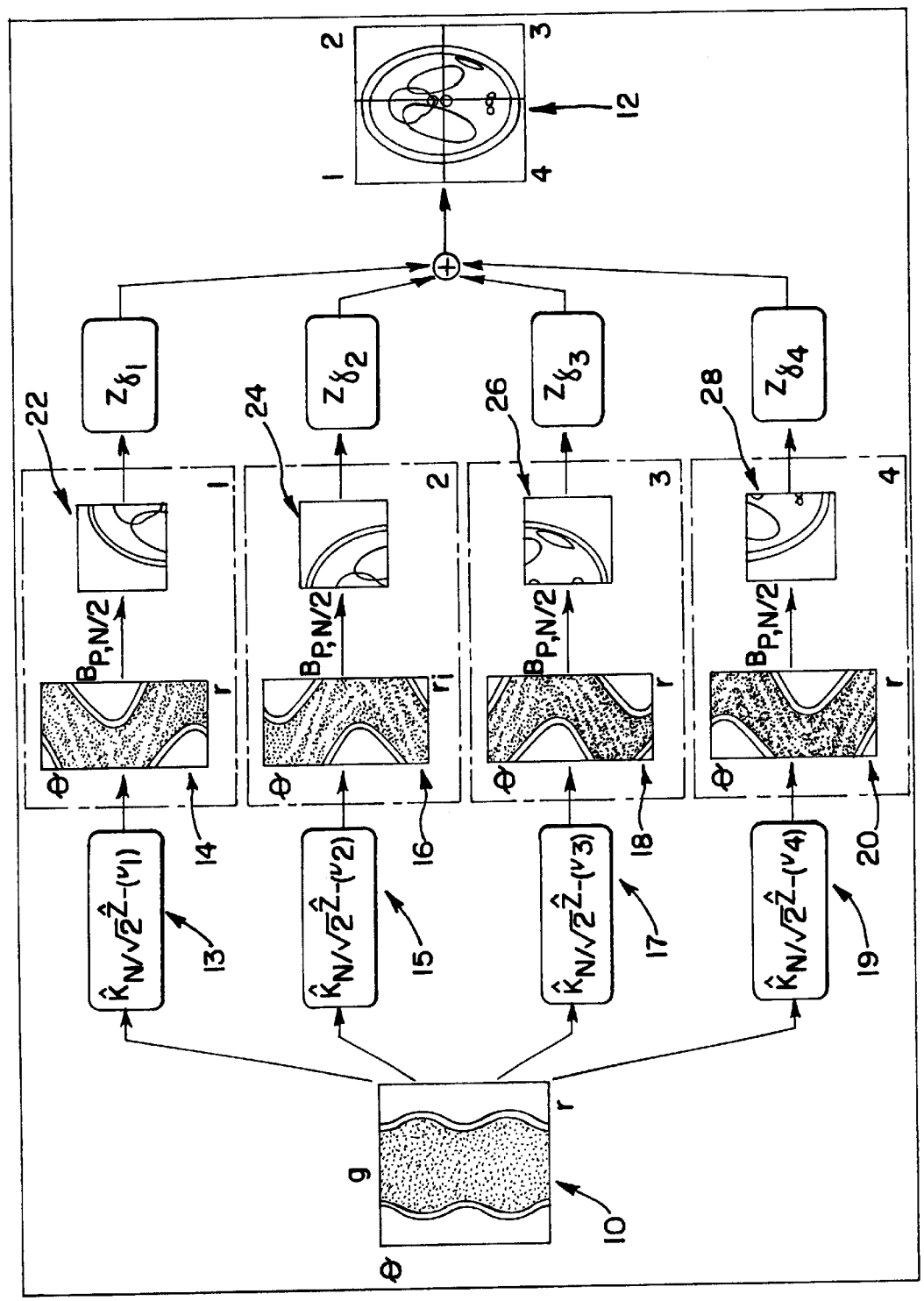
FIG. 2 is a diagram of the steps in a decomposition algorithm used in the present invention.

The algorithm used with the method shown in FIG. 2 is derived as follows. Consider an N×N pixel object, with pixel size normalized to 1. Assume P view angles, uniformly spaced on $[0, 2\pi]$, although the algorithm can be easily generalized to other view angle distributions. In order to simplify the expressions in this section as much as possible, an operator formulation will be used.

The Hilbert spaces that arise in the formulation are as follows:

$$L_2(\mathbb{R}^2),$$

the space of square-integrable functions supported on $\mathbb{R}^2$;

$$L_2^P(\mathbb{R}),$$

the space of P-tuples of square-integrable functions;

$$l_2(Z^2),$$

the space of square summable 2D sequences; and $$l_2^P(Z),$$

the space of P-tuples of square summable sequences. All spaces are equipped with the standard, unweighted inner products. A version of discrete backprojection will be used that incorporates a modification that is required to construct the hierarchical decomposition. The discrete backprojection operator is a map $$B_{P,N} : l_2^P(Z) \mapsto l_2(Z^2)$$

that produces a discrete image (element of $l_2(Z^2)$) with N×N support from P discrete projections (each an element of $l_2(Z)$). $B_{P,N}$ is affected by a further parameter $\tau \in [-0.5, 0.5]^P$, a vector of radial shifts, whose purpose will be explained shortly. The dependence of $B_{P,N}$ on $\tau$ is suppressed for notational convenience.

This discrete backprojection operator is decomposed into a product of four simpler operators. Specifically, $$B_{P,N} = K_N S B_P I_\tau$$

where $$B_{P,N} : l_2^P(Z) \mapsto L_2^P(\mathbb{R})$$

is the radial interpolation operator with shifting by $\tau$ $$I_\tau g(r, p) = \sum g(k, p)\phi(r - (k + \tau_p)T),$$

where T is the radial sampling period, and $\phi$ is the convolutional interpolation kernel used. This operator interpolates each of the projections, shifting the p-th projection by $\tau_p$. For the case of simple linear interpolation, $\phi(x)=\Lambda(x/T)$, where $$\Lambda(x) = \begin{cases} 1 - |x| & |x| \leq 1 \\ 0 & \text{else} \end{cases}.$$

The operator $$B_p : L_2^P(\mathbb{R}) \mapsto L_2(\mathbb{R}^2)$$

is the backprojection operator for unsampled sinograms, defined by $$B_p g_c(x, y) = \sum_{j=1}^{P} g_c\left(x\cos\frac{2\pi j}{P} + y\sin\frac{2\pi j}{P}, j\right)$$

The next operator $S: L_2(\mathbb{R}^2) \to l_2(\mathbb{Z}^2)$ is the mollification, or sampling operator that represents the backprojected function on a discrete grid. Assume that this operation is shift invariant, and that the coordinates have been scaled so that S can be written as $$Sf_c(i,j) = \int \int f_c(x,y) b(x-i, y-j) dx dy.$$

The function b(x,y) may be an indicator function for a pixel, or some smoother function. Assume that b(x,y) is chosen to be smooth and have small support. Suggestions for b(x,y) include tensor splines, truncated Gaussians, and smooth, rotationally symmetric functions.

The final two operators which will be used are truncation operators. The first truncation operator $K_N : l_2(\mathbb{Z}^2) \mapsto l_2(\mathbb{Z}^2)$ windows the argument 2D sequence to a square of size N×N, approximately centered at the origin (depending on whether N is odd or even), $$K_N f(i, j) = \begin{cases} f(i, j) & i, j \in Z, -\frac{N}{2} < i, j \leq \frac{N}{2} \\ 0 & \text{else}. \end{cases}$$

The second truncation operator $\hat{K}_M : l_P^2(Z) \mapsto l_P^2(Z)$ windows the argument radially to a width of $M+\lambda(\phi)$, where $\lambda(\phi)$ is the length of the support of the interpolation kernel in $I_\tau$.

$$\hat{K}_M g(k, p) = \begin{cases} g(k, p) & |k| \leq \frac{[M + \lambda(\phi)]}{2} \\ 0 & \text{else}. \end{cases}$$

If $\phi$ is a sinc kernel, then clearly $K_N$ has no effect on the input sequence.

To derive the hierarchical decomposition, the interaction of $B_{P,N}$ with two operations should be examined: 2D shifts (translations) of the output, and truncations of the output. To examine this interaction in detail, a series of simple properties will be presented, each of which explicitly describe the interaction of various shift and truncation operations with each of the operators defined above. Proofs of these properties are omitted, as they follow directly from the appropriate definitions. First, four shift operators will be defined. The first is a discrete shifter $Z_\delta : l_2(\mathbb{Z}^2) \mapsto l_2(\mathbb{Z}^2)$, with $\delta \in \mathbb{Z}^2$, defined by $$Z_\delta f(i,j) = f(i-\delta_1, j-\delta_2).$$

The second operator is a continuous shifter $M_\delta : L_2(\mathbb{R}^2) \mapsto L_2(\mathbb{R}^2)$, with $\delta \in \mathbb{R}^2$, defined by $$M_\delta f_c(x,y) = f_c(x-\delta_1, y-\delta_2).$$

Consider two sinogram domain shift operators, one discrete and one continuous. The first is $\hat{Z}_\delta : l_P^2(Z) \mapsto$ for $\delta \in Z^P$, defined by $$\hat{Z}_\delta g(k,p) = g(k-\delta_p, p).$$

The second is a continuous shifter $$\hat{M}_\delta : L_2^P(R) \mapsto L_2^P(R),$$

defined by $$\hat{M}_\delta g_c(r,p) = g_c(r-\delta_p, p),$$

where $\delta \in \mathbb{R}^P$.

Property 1 (Shift property of Bp).

$$M_\delta B_p g_c(x,y) = B_p \hat{M}_{W(\theta)\delta} g_c(x,y),$$

where $\delta \in \mathbb{R}^2$, and $W: [0, 2\pi]^P \mapsto \mathbb{R}^{P \times 2}$ is defined by $$W(\theta) = \begin{bmatrix} \cos\theta_1 & \sin\theta_1 \\ \cos\theta_2 & \sin\theta_2 \\ \vdots & \vdots \\ \cos\theta_P & \sin\theta_P \end{bmatrix}$$

Property 2 (Shift property of S). As would be expected from the shift invariance of S, $$Z_\delta S f_c(i,j) = S M_\delta f_c(i,j)$$

for $\delta \in \mathbb{Z}^2$.

Property 3 (Shift property of $I_\tau$).

$$\hat{M}_\delta I_\tau g(r,p) = I_{<\tau+\delta/T>} Z_{-[\tau+\delta/T]} g(r,p)$$

where $[x]_i$ is rounded to the nearest integer, and $<x>_i = x - [x]_i$.

Property 4 (Truncation of $B_{P,N}$ input).

$$B_{P,N} = B_{P,N} \hat{K}_{N\sqrt{2}}$$

The hierarchical decomposition of the backprojection operator is shown in the following theorem. Theorem 1.

For $N=2^K$ for $K \in Z$, $K \geq 1$, $$B_{P,N}g(i,j) = \sum_{i=1}^{4} Z_{\delta_i} B_{P,N/2} \hat{K}_{N/\sqrt{2}} \hat{Z}_{-[v_i]} g(i,j),$$

where for N>2, $\delta_1=[N/4,N/4]^T$, $\delta_2=[-N/4,N/4]^T$, $\delta_3=[N/4,-N/4]^T$, $\delta_4=[-N/4,-N/4]^T$ and for N=2, $\delta_1=[1,0]^T$, $\delta_2=[0,0]^T$, $\delta_3=[1,1]^T$, $\delta_4=[0,1]^T$.

In all cases, $v_i = W(\theta)\delta_i$

To summarize, the decomposition of Theorem 1 consists of terms of the form $$B_{P,N/2} \hat{Z}_{-[v_i]} g(i,j),$$

which is essentially the backprojection of an N/2×N/2 quadrant of the original image, using the same number of projections P. The decomposition consists of the following steps.

1. The projections are shifted so that they correspond to the ith quadrant of the image being centered at the origin.
2. The projections are then radially truncated to the width used by the backprojection $B_{P,N/2}$.

Steps 1 and 2 above describe the processing steps 13, 15, 17 and 19 of FIG. 2.

Figure 3:
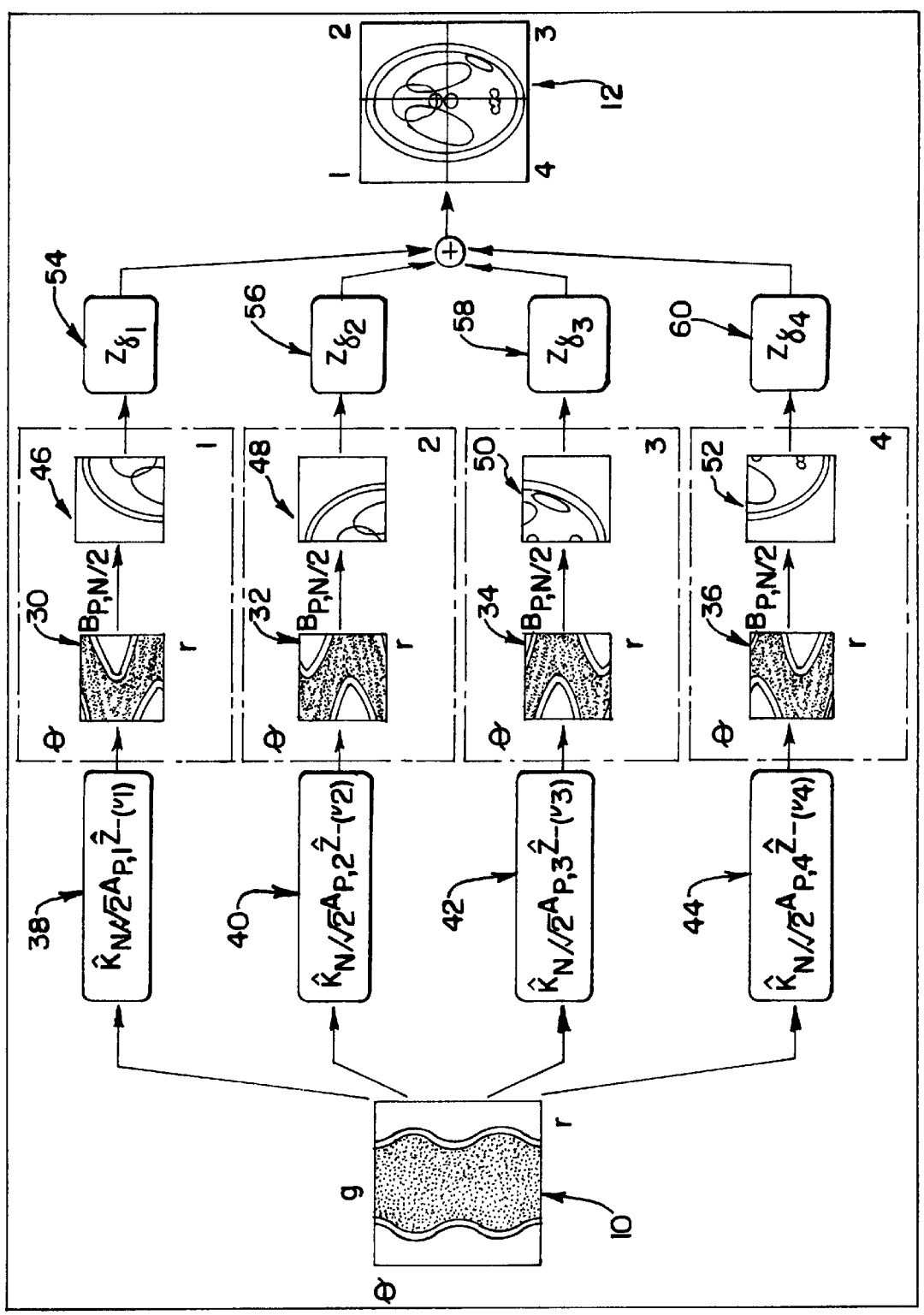
FIG. 3 is a diagram of an additional decomposition algorithm used in the present invention.

FIG. 3 is a diagram of the method of the present invention when the approximation decomposition algorithm is used. As in FIG. 2, the sinogram 10 is subdivided into successively smaller subsinograms until the smallest sinograms correspond to subimages as small as one pixel in size. Thus, for example, if the sinogram 10 corresponded to a four pixel size image, the sinogram would be divided into four subsinograms 30, 32, 34 and 36, which are processed using an approximation described below, in steps shown at 38, 40, 42 and 44. The subsinograms 30, 32, 34 and 36 are then backprojected to form subimages 46, 48, 50 and 52. The subimages 46, 48, 50 and 52 are then aggregated in processing steps 54, 56, 58 and 60, to form the image 12.

Generally, this algorithm corresponds to the following steps:

1. The sinograms are radially shifted so that they correspond to the ith quadrant of the reconstruction being centered at the origin.
2. The sinograms are angularly resampled to reduce the number of angles by a factor of two.
3. The sinograms are radially truncated to the width used by the backprojection.

Steps 1 through 3 above describe the processing in steps 38, 40, 42 and 44 in FIG. 3, but not steps 13, 15, 17 and 19 in FIG. 2.

The approximate decomposition algorithm used in the processing steps of FIG. 3 will now be described in greater detail.

Instead of backprojecting the smaller N/2×N/2 subimages using all P projections, as prescribed in Theorem 1, the sinograms are angularly re-sampled from P to P/2 projections before backprojecting, so that each term in the sum involves a backprojection to an N/2×N/2 size object using P/2 projections. This basic concept will be developed into the approximation decomposition algorithm used in FIG. 3.

Next, define the angular resampling operator $$O_{P_1 \mapsto P_2} : L_2^{P_1}(R) \mapsto L_2^{P_2}(R)$$

that angularly resamples $g_c$ by the ratio $P_2/P_1$. The operator can be written as $$O_{P_1 \mapsto P_2} g_c(r,q) = \sum_{p=0}^{P_1-1} g_c(r,p) \psi\left(\frac{2\pi q}{P_2} - \frac{2\pi p}{P_1}\right),$$

where $\psi$ is the angular interpolation kernel (a Dirichlet kernel for the case of uniformly spaced angles and angularly bandlimited $g_c$). After sub-dividing the sinogram for a N×N image into subsinograms for N/2×N/2 subimages, only P/2 projections are needed to accurately reconstruct the subimages. Hence, replace the term $$B_{P,N/2} g_c$$

in Theorem 1 by the term $$B_{P/2,N/2} O_{P \mapsto P/2} g_c$$

where $g_c$ is radially bandlimited, with bandlimit B.

The decomposition of Theorem 1 can be approximated (if $I_T$ is an ideal bandlimited radial interpolator with bandlimit B) by $$B_{P,N} g(m,n) \approx \sum_{i=1}^{4} Z_{\delta_i} K_{N/2} S B_{P/2,N/2} O_{P_1 \mapsto P_2} I_{<v_i>} \hat{Z}_{-[v_i]} g(m,n).$$

The second step involves the interchange of $O_{P \mapsto P/2}$ and $I_\tau$. For simplicity, define $D_2 = O_{P \mapsto P/2}$, and define a decimator $\downarrow 2: \mathbb{R}^P \mapsto \mathbb{R}^{P/2}$ as $(x \downarrow 2)_p = x_{2p}$. Suppose $I_T$ is a perfectly bandlimited interpolator, with $\phi$ bandlimited to radial bandwidth $B \leq 1/(2T)$. Then for any sequence $$g \in l_2^P(Z),$$

$I_T g$ can be exactly interpolated from radial samples at rate T<1/2B using bandlimited interpolation. It follows that for each i=1, . . . 4, $$D_2 I_{<v_i>} \hat{Z}_{-[v_i]} g(r,p) = I_{v_i \downarrow 2} G_{v_i \downarrow 2} D_2 I_{<v_i>} \hat{Z}_{-[v_i]} g(r,p),$$

where $$G_\tau : L_2^{P/2}(R) \mapsto l_2^{P/2}(Z)$$

is a generalized resampling operator, defined by $$G_\tau g_c(k,p) = g_c((k+\tau_p)T, p).$$

This decomposition is exact when $I_{<v_i>}$ is ideal bandlimited interpolation. In practice, good approximations can be obtained with faster decaying interpolation schemes if $1/T \gg B$.

The operation $$A_{P,i} : l_2^P(Z) \mapsto l_2^{P/2}(Z)$$

where $$A_{P,i} = G_{v_i \downarrow 2} D_2 I_{<v_i>}$$

is a discrete to discrete mapping that incorporates the radial interpolation, angular smoothing and decimation, and radial sampling all in one step. Using this definition, the final form for the approximate decomposition of the backprojection operator is $$B_{P,N} g(i, j) \approx \sum_{i=1}^{4} Z_{\delta_i} K_{N/2} S B_{P/2} I_{<v_i>l2} A_{P,i} Z_{-[v_i]} g(i, j)$$

$$= \sum_{i=1}^{4} Z_{\delta_i} B_{P/2, N/2} A_{P,i} \hat{Z}_{-[v_i]} g(i, j)$$

Reincorporating the radial truncation K, the final decomposition of $B_{P,N}$ is $$B_{P,N} g(i, j) \approx \sum_{i=1}^{4} Z_{\delta_i} B_{P/2, N/2} \hat{K}_{N/\sqrt{2}} A_{P,i} \hat{Z}_{-[v_i]} g(i, j)$$

The decomposition of this formula is illustrated in FIG. 3 for comparison with FIG. 2.

The algorithms used in the process of FIG. 2 produce an accurate result, but by themselves do not reduce the computational cost of processing. The algorithms used in the process of FIG. 3 are fast, but less accurate because of the approximations used. However, by combining the processes of FIGS. 2 and 3, speed can be greatly increased without significantly compromising accuracy, by artificially increasing the sampling rate in the process.

The two algorithms can be used in a variety of combinations, such as the combination used in the following psuedocode:

```
algorithm initialized with l=Q
function f=HBP (τ, θ, g, l)
N=size (f)
if (N>1 pixel)
   f=0
   for (i=1; i≦4; i++)
      if (1≦0)
         f_0=HBP (τ↓2,θ↓2,K̂_{N/√2}A_{P,i}Ẑ_{-[84 ĵ]}g,l)
      else
         f_0=HBP (τθẐ_{-[v_i]}g,l−1)
      end if
      f=f+Z_{δ_i}f_0
   end for
else
   f=BP(τ,θ,g)
end if
end function
``` where BP(τ,θ) implements $f = B_{P,N} g$.

The exact decomposition algorithm is used Q consecutive times, and the approximate decomposition algorithm is used for the remaining recursions. The parameter Q is chosen to obtain the desired accuracy and speed.

Angular oversampling and radial oversampling can be used before decompositions to increase accuracy, which allows Q to be reduced. This increases the decomposition speed because the approximate decomposition algorithm can be used more often without losing accuracy.

Under the assumption that the processing in blocks 38, 40, 42 and 44 of FIG. 3 can be completed in O(PN) time, where the subsinograms in blocks 30, 32, 34 and 36 are size P×N, the operation count for the psuedocode above is $$O(2^Q PN(\log_2 N - Q + 1)),$$

which reduces to $PN\log_2 N$ for Q=O, and to $PN^2$ for $Q=\log_2 N$.

The method of the present invention was tested on a Shepp-Logan head phantom. Similar results were obtained using other types of phantoms. Analytical projections of the Shepp-Logan phantom were computed, and then reconstructions performed on a 256×256 pixel grid. The distortion was measured on the interior portion of the skull, which was assumed to be the region of interest. HBP was used with ramp-filtered projections to form the reconstructions.

Figure 4:
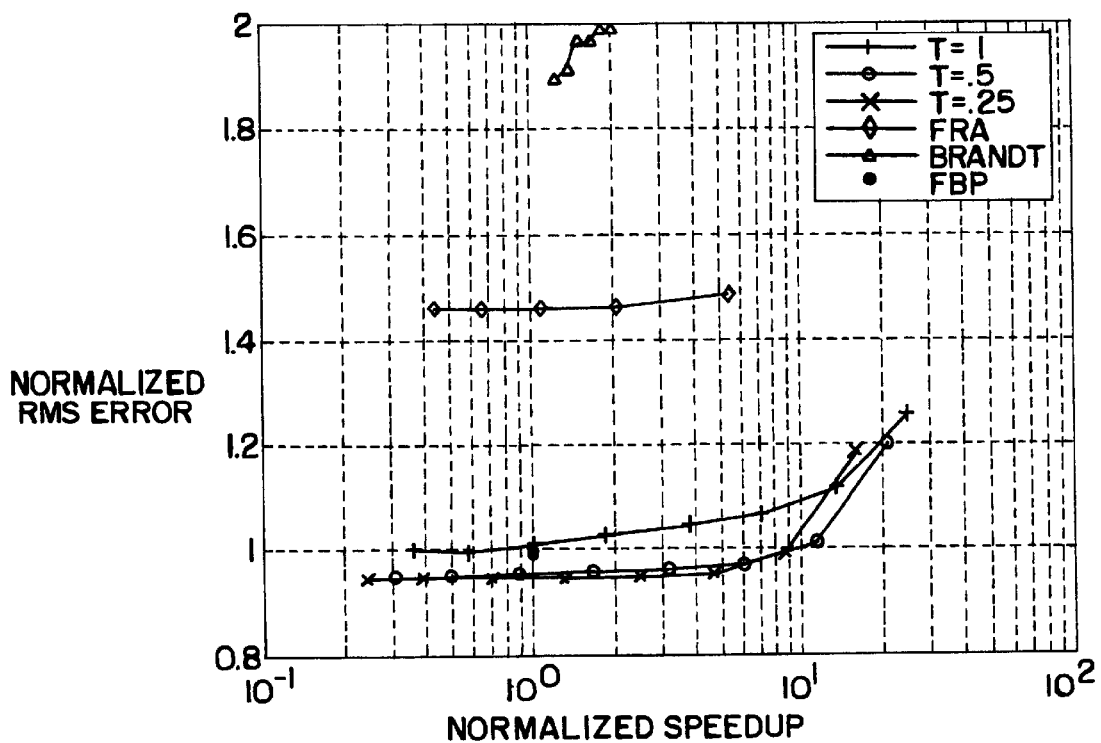
FIG. 4 is a graph showing the results obtained by the present invention, compared with known processes.

FIG. 4 depicts the performance of different algorithms in terms of speed-up and accuracy. Here, points (represented by runs of the algorithm with different parameter choices) further to the right represent greater speedup, while points closer to the x-axis represent more accurate reconstructions. Compare the reconstruction by gridding and Brandt's method to the reconstructions of the present invention. The curve for the FRA is obtained by performing reconstructions for a variety of choices of K. The curve for Brandt's method was obtained by varying the minimum number of samples to take in the slow direction of any grid. The curves for the present invention were obtained by varying Q and the amount of radial oversampling. Q decreases as the speed increases, indicated by movement to the right along the x-axis. FIG. 4 shows that for this phantom, and these implementations, the FRA and Brandt's method are uniformly and significantly outperformed by the proposed algorithm. Attempts to improve the performance of the FRA by changing the parameters recommended in J. Schomberg and J. Timmer, "The Gridding Method for Image Reconstruction by Fourier Transformation", IEEE Trans. Med. Imag., vol. 14, September 1995 were unsuccessful. Attempts to improve the performance of Brandt's method by deviating from the guidelines of U.S. Pat. No. 5,778,038 were also unsuccessful.

FIG. 4 also shows the results obtained using the direct FBP method of FIG. 7, to which FIG. 4 is normalized. The improvement over FBP realized by the present invention is also apparent from a review of FIG. 4.

Figure 5:
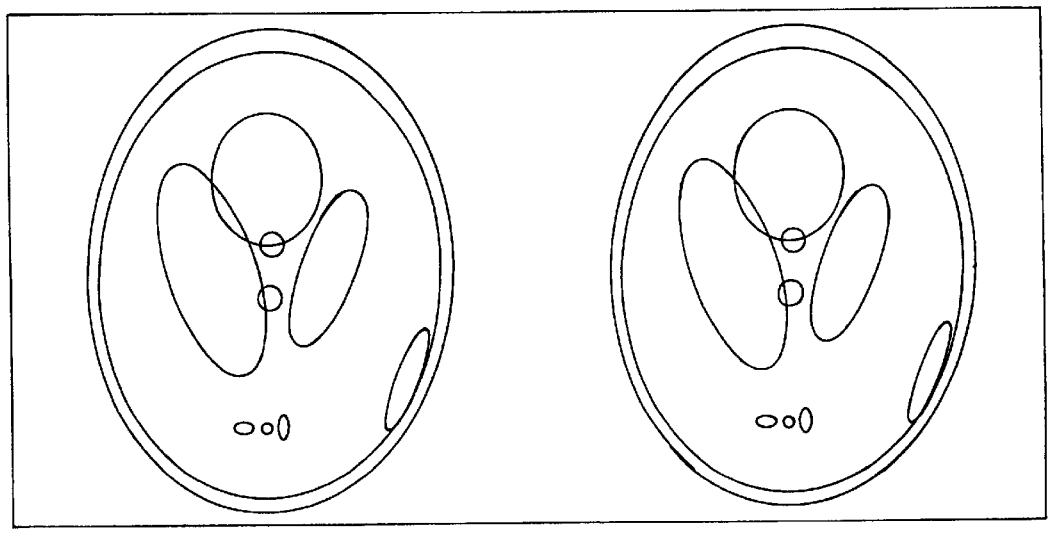
FIG. 5 is a comparison of images obtained with the present invention and a known method.

As a final subjective comparison, FIG. 5 depicts full 1024×1024 reconstructions from 1024 uniformly spaced projections on [0,π) using the HBP (left) and FBP (right) algorithms. Here, a truncation was applied to all densities above 0.05 to show the detail of the skull and any artifacts exterior to the skull. The full reconstructions are visually indistinguishable, but the reconstruction on the left was over 90 times faster than the reconstruction on the right. Greater performance gains should be obtainable through the obvious parallel implementation of the algorithm and optimization of the code. Slice plots through the rows and columns of these two reconstructions, shown in FIGS. 6(a) and 6(b), reinforce the visual assessment.

On the basis of this phantom and repeated experiments for different sized pixel grids (up to 1024×1024), an empirical speedup of $\approx N/\log_2 N$ for reconstructions of visual quality similar to the FBP via the HBP algorithm is suggested. Extrapolating this speedup suggests that for high resolution medical imaging, with 4096×4096 pixel images, speedups of greater than two orders of magnitude should be achievable with reconstructions of visual quality comparable to the FBP.

A class of fast algorithms for fast backprojection from 2D tomographic data have been developed. Methods using these algorithms provide orders of magnitude speedup in reconstruction time with little or no added distortion. The proposed algorithms are parallelizable, simple, and outperform Fourier Reconstruction Algorithms as well as Brandt's method in terms of reconstruction distortion and CPU time.

While the principles of the invention have been described above in connection with specific apparatus and applications, it is to be understood that this description is made only by way of example and not as a limitation on the scope of the invention.

We claim:

1. A process for generating an electronic image from a sinogram comprising the steps of
    subdividing the sinogram into a plurality of subsinograms;
    backprojecting each of said subsinograms to produce a plurality of corresponding subimages, and
    aggregating said subimages to create the electronic image.

2. The method of claim 1 wherein said backprojecting step includes performing a number of approximations.

3. The method of claim 1 wherein said backprojecting step includes performing a number of exact subdivisions.

4. The method of claim 1 wherein said sinogram is subdivided into a plurality of subsinograms in a recursive manner, wherein said subdividing steps include a number of exact subdivisions and a number of approximate subdivisions.

5. The method of claim 1 wherein said aggregation step of subimages is performed in a recursive manner.

6. The method of claim 1 wherein said electronic image is a tomographic image.

7. The method of claim 1, wherein at least one of the steps is performed by special purpose hardware.

8. The method of claim 1 wherein said sinograms are subdivided in a recursive manner, until each subsinogram represents an image of a desired size.

9. The method of claim 8 wherein said subsinogram images are one pixel in size.

10. The method of claim 1 wherein the sinogram includes filtered projections.

11. The method of claim 1 further comprising preprocessing in which angular and radial oversampling are used to improve the accuracy of the electronic image.

12. The method of claim 11, wherein at least one of the steps is performed by special purpose hardware.

13. Apparatus for generating an electronic image of an object comprising;
    means for scanning the object to generate data representing an image of the object;
    means for processing said data to generate a sinogram which includes a plurality of filtered projections;
    means for subdividing said sinogram into a plurality of subsinograms;
    means for backprojecting each of said subsinograms to produce a plurality of corresponding subimages;
    means for aggregating said subimages to create the electronic image; and
    means for displaying the electronic image.

14. The apparatus of claim 13 wherein said sinograms are subdivided into a plurality of subsinograms in a recursive manner, wherein said means for subdividing performs a number of exact subdivisions and a number of approximate subdivisions.

15. The apparatus of claim 13 wherein said means for aggregating operates in a recursive manner.

16. The apparatus of claim 13 wherein said electronic image is a tomographic image.

17. The apparatus of claim 13, comprising at least some special purpose hardware.

18. The apparatus of claim 13 wherein said means for subdividing operates in a recursive manner, until each subsinogram represents an image of a desired size.

19. The apparatus of claim 18 wherein said subsinogram images are one pixel in size.

20. The apparatus of claim 13 wherein said means for backprojecting performs a number of approximate subdivisions.

21. The apparatus of claim 13 wherein said means for backprojecting performs a number of exact subdivisions.

22. The apparatus of claim 13 wherein said means for processing performs angular and radial oversampling to improve the accuracy of the electronic image.

23. The apparatus of claim 22, comprising at least some special purpose hardware.

* * * * *

UNITED STATES PATENT AND TRADEMARK OFFICE
CERTIFICATE OF CORRECTION

PATENT NO. : 6,282,257 B1
DATED : August 28, 2001
INVENTOR(S) : Basu et al.

It is certified that error appears in the above-identified patent and that said Letters Patent is hereby corrected as shown below:

Title page,
Item (56) References Cited, U.S. PATENT DOCUMENTS, insert -- 5,579,358 11/1996 Lin --.
OTHER PUBLICATIONS, delete "T.M. Peters; "Algorithms for Fast Back-and-Re-Projection in Computed Tomography'; IEEE Transactions on Nuclear Science, vol. NS-28, No. 4, pp. 3641-3646; Aug. 1961." and insert -- T.M. Peters; "Algorithms for Fast Back-and-Re-Projection in Computed Tomography'; IEEE Transactions on Nuclear Science, vol. NS-28, No. 4, pp. 3641-3646; Aug. 1981. --

Column 3,
Line 47, delete "NxN" and insert -- $N$x$N$ --.
Line 49, delete "N/2xN/2" and insert -- $N/2$x$N/2$ --.
Line 52, delete "N" and insert -- $N$ --.
Line 53, delete "N/2" and insert -- $N/2$ --.
Line 55, delete "(N/2)$^2$xN/2=N$^3$/8" and insert -- $(N/2)^2$x$N/2=N^3/8$ --.
Line 57, delete "N$^3$/2" and insert -- $N^3/2$ --.
Line 58, delete "N$^3$" and insert -- $N^3$ --.
Line 60, delete "N$^2$ log N" and insert -- $N^2 \log N$ --.

Column 4,
Line 21, delete "NxN" and insert -- $N$x$N$ --.
Line 22, delete "P" and insert -- $P$ --.
Lines 36 and 47, delete "P-tuples" and insert -- $P$-tuples --.

line 40, delete "12(Z2)" and insert -- L!2 (Z2) -- .

line 43, delete "1 2 (Z)," and insert -- 2 2 (Z), --.

line 54, delete " B$P,N$ : $l$ 2 (Z) H $12$ (Z2 ) " *and* insert -- $B P,N : \sim2$ (Z) H $\sim$ 2 (7~2 ) --. , line 56, delete "12(Z2)" and insert -- f2 (Z2)

line 56, delete "NxN" and insert -- $N$ x $N$ --.
line 57, delete "P" and insert -- $P$ --.
line 58, delete "1$_2$(Z)" and insert -- $\ell_2$ (Z) --.

Column 5,
line 3, delete "BP,N : Iz (Z) H 92 (118)" and insert -- IT : 2i (Z) H $Lz$ $(R)$ --.

line 11, delete "T" and insert -- $T$ --.
line 13, delete "p-th" and insert -- $p$-th --.
line 14, delete "φ($x$) = Λ(x/T)" and insert -- φ($x$) = Λ($x/T$) --.

Page 1 of 5

UNITED STATES PATENT AND TRADEMARK OFFICE
CERTIFICATE OF CORRECTION

PATENT NO. : 6,282,257 B1  Page 2 of 5
DATED : August 28, 2001
INVENTOR(S) : Basu et al.

It is certified that error appears in the above-identified patent and that said Letters Patent is hereby corrected as shown below:

Column 5 (cont'd),
line 23, delete " Bp $: L$ 2 (R) H $L2$ (R2 )" and insert -- Bp : L Z (R) H $L2 ( RZ )$ --.

Line 31,--delete "S: Lz(Rz) -> $12(762)$" and insert --$S : LZ(R2)$ -a $:\sim 2(Z2)$ --.

line 38, insert a space between "$dxdy$" to read as -- $dx\,dy$ --.
lines 39, 40 and 41, delete "b(x,y)" and insert -- $b(x,y)$ --.

Line 46, delete "$KN :12(72)\ t\text{->}\ 12(762)$" and insert --KN $:12(762)\ t\text{-}\ 12(762)$--.

Line 47, delete "NxN" and insert -- $NxN$ --.
Line 49, delete "N" and insert -- $N$ --.

Line 55, delete " KM $:\ lP$ (Z) H lp (Z) " and insert -- $KM$ :1P (7G) H lP (7G) --.

Line 56, delete "M + λ(φ)" and insert -- $M + \lambda(\varphi)$ --.
Line 57, delete "$I_\tau$" and insert -- $I_\tau$ --.

Column 6,
Line 8, delete " Za :12 (7Gz ) H 12 (7G2) " and insert -- Za :12 (Z2 ) H 12 (7G2 ) --.

Line 14, delete " Ma : L2 (R2) H L2R2) " and insert -- M, : L2 (1182) H L2 (1182 ) --.

Line 22, delete "Zs : lP (Z) E--> for 8 E ZP" and insert - Zs :lp(Z) H 1P2 (Z) forBE $ZP$--.

Line 38, delete "$B_p$" and insert -- $Bp$ --.
Line 50, delete "S" and insert -- $S$ --.
Line 56, delete "$I_\tau$" and insert -- $I_\tau$ --.

Column 7,
Lines 25 and 63, delete "N/2xN/2" and insert -- $N/2xN/2$ --.
Lines 27 and 64, delete "P" and insert -- $P$ --.
Line 65, delete "P to P/2" and insert -- $P$ to $P/2$ --.

Column 8,
Line 1, delete "P/2" and insert -- $P/2$ --.
Line 8, delete "$P_2/P_1$" and insert -- $P_2/P_1$ --.
Line 17, delete "NxN" and insert -- $NxN$ --.
Line 18, delete "N/2xN/2" and insert -- $N/2xN/2$ --.
Line 18, delete "P/2" and insert -- $P/2$ --.
Lines 30 and 33, delete "B" and insert -- $B$ --.
Line 32, delete "$I_T$" and insert -- $I_T$ --.

UNITED STATES PATENT AND TRADEMARK OFFICE
CERTIFICATE OF CORRECTION

PATENT NO.   : 6,282,257 B1                                              Page 3 of 5
DATED        : August 28, 2001
INVENTOR(S)  : Basu et al.

It is certified that error appears in the above-identified patent and that said Letters Patent is hereby corrected as shown below:

Column 8 (cont'd),
Line 35, delete *"BP,,g(m,n) _ Z'5KN/2SBP/2,Nl20P1HP2I,,Z_p,}g(m,n)"*and /=t4 insert *"rBPg(lYl-,Yl)_-_-ZdrKNl2SBPh2,Nl20PHP2 1<v;>Z_[v,)g(m,n) i=t*

Line 39, delete " Op,, P / 2 and I. " and insert -- *OP, ,P / 2* and IT --.

Line 40, delete " D2 = *op*" P / 2 " and insert -- *DZ = OPHP / 2* --.

Line 43, delete "(2T)" and insert -- (2*T*) --.
Line 48, delete "I$_\psi$ g" and insert -- *I*$_\tau$ g --.
Line 49, delete "T<1/2B" and insert -- *T*< 1/2*B* --.
Line 50, delete "i= 1,. . .4," and insert -- *i*=1,. . .4, --.

Line 64, delete "I<,;," and insert --I<,;,--.

Line 67, delete "1/T>>B" and insert -- 1/*T* >> *B* --.

Column 9,
Line 3, delete " AP,, : l2 (Z) H l2 12(Z) " and insert -- AP,; : OZ) *H* ,12 /z (Z) --.f;.

Line 15, delete ~~~~~~~~~~~~~~~~~~~~~~~~~~~~~ and insert ~~~~~~~~~~~~~~~~~~~~~~~~~~~~~~~~~~~

Line 25, delete "BP,N g (i, j) ~ YZs,BP/2,Nl2 *KN, f* AP,i Z_[~;) g (i, j) " and insert i=I 4 *g (i, j)* P,NlZs,BP/z,N/2 *KNlf* AP,i Z-[,;]g (1,J)i=1   1

UNITED STATES PATENT AND TRADEMARK OFFICE
CERTIFICATE OF CORRECTION

PATENT NO. : 6,282,257 B1  
DATED : August 28, 2001  
INVENTOR(S) : Basu et al.

It is certified that error appears in the above-identified patent and that said Letters Patent is hereby corrected as shown below:

<u>Column 9 (cont'd),</u>
Delete lines 43-60 in their entirety, and insert the following:
-- algorithm initialized with $\ell = Q$
```
    function f = HBP (τ, θ, g, ℓ)
    N = size (f)
    if (N > 1 pixel)
        f = 0
        for (i = 1; i ≤ 4; i + +)
            if (ℓ ≤ 0)
                f₀ = HBP        (τ ↓ 2, θ↓ 2, KN/,rz AP.i Z_[,.] g, 0
            else
                f₀ = HBP        (z 6, Z_tv,~ g, -1)
                            end if
            f = f + Z δi f₀
        end for
    else
        f = BP(τ, θ, g)
    end if
end function
``` where $BP(\tau,\theta)$ implements $f = B_{P,N}\, g$. --.
Lines 61, 63 and 67, delete "Q" and insert -- $Q$ --.

UNITED STATES PATENT AND TRADEMARK OFFICE
CERTIFICATE OF CORRECTION

PATENT NO. : 6,282,257 B1
DATED : August 28, 2001
INVENTOR(S) : Basu et al.

It is certified that error appears in the above-identified patent and that said Letters Patent is hereby corrected as shown below:

Column 10,
Line 4, delete "O(PN)" and insert -- $O(PN)$ --
Line 5, delete "PxN" and insert -- $PxN$ --.
Line 9, delete "O($2^Q$PN(log$_2$ N-Q+1))," and insert -- $O(2^Q PN(\log_2 N\text{-}Q+1))$, --.
Line 10, delete "PNlog$_2$" and insert -- $PN \log_2$ --.
Line 10, delete "N for Q=O" and insert -- N for $Q$=O --.
Line 11, delete "Q=log$_2$N" and insert -- Q=log$_2 N$ --.
Line 28, delete "K" and insert -- $K$ --.
Lines 31 and 32, delete "Q" and insert -- $Q$ --.
Line 64, delete "≈N/log$_2$N " and insert -- ≈$N \log_2 N$ --.

Signed and Sealed this

Seventeenth Day of February, 2004

JON W. DUDAS
*Acting Director of the United States Patent and Trademark Office*